No. 719,328. PATENTED JAN. 27, 1903.
R. B. HAIN.
GOVERNOR AND THROTTLE VALVE CONTROLLING MECHANISM.
APPLICATION FILED JULY 30, 1902.
NO MODEL.
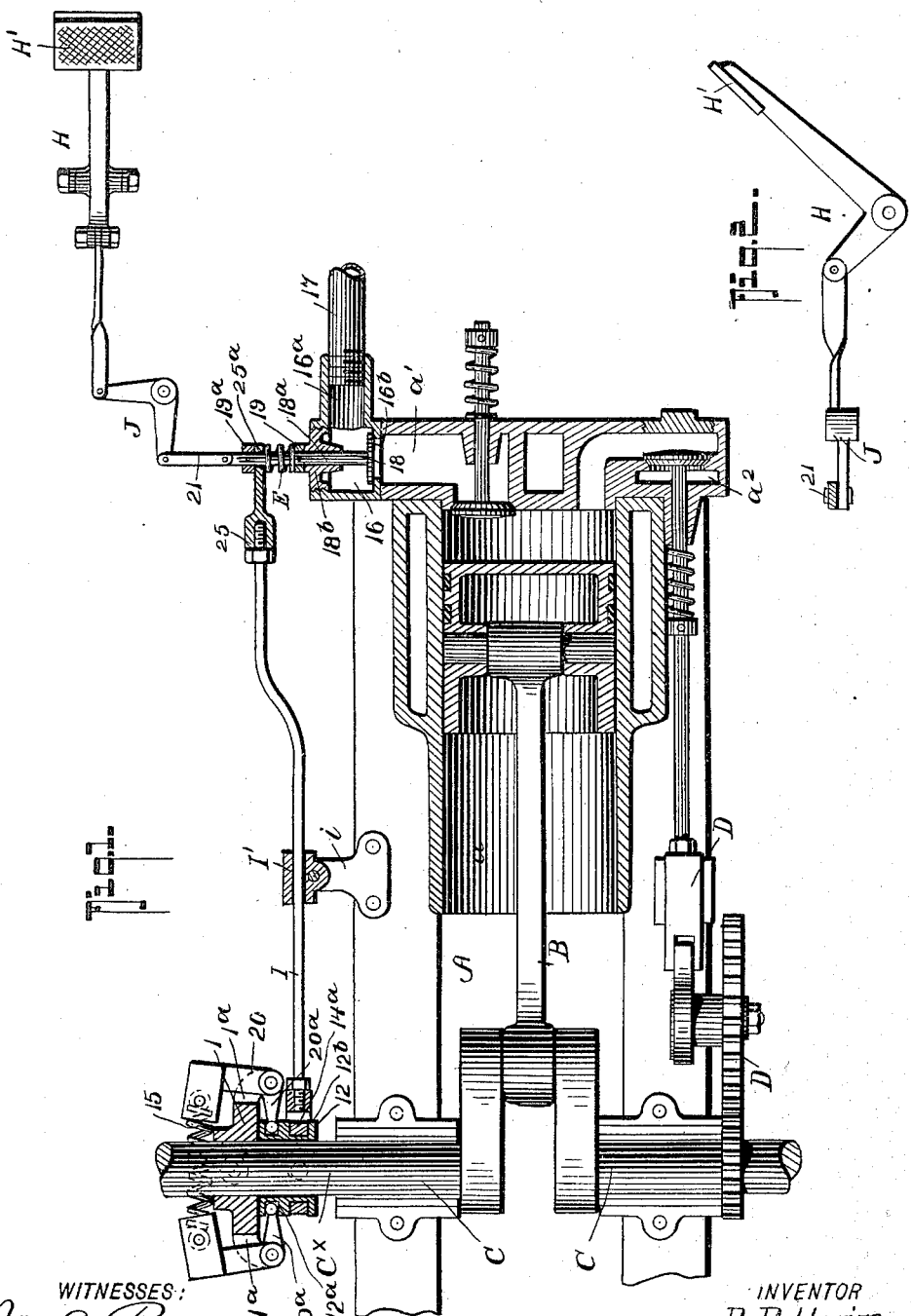
WITNESSES:
Jos. A. Ryan
G. P. Kingsbury.
INVENTOR
R. B. Hain.
BY Munn & Co.
ATTORNEYS.
THE NORRIS PETERS CO., PHOTO-LITHO., WASHINGTON, D. C.

UNITED STATES PATENT OFFICE.

RALPH BENTON HAIN, OF LOS ANGELES, CALIFORNIA, ASSIGNOR TO AUTO VEHICLE COMPANY, OF LOS ANGELES, CALIFORNIA, A CORPORATION OF CALIFORNIA.

GOVERNOR AND THROTTLE-VALVE-CONTROLLING MECHANISM.

SPECIFICATION forming part of Letters Patent No. 719,328, dated January 27, 1903.

Application filed July 30, 1902. Serial No. 117,652. (No model.)

*To all whom it may concern:*

Be it known that I, RALPH BENTON HAIN, residing at Los Angeles, in the county of Los Angeles and State of California, have invented a new and Improved Governor and Throttle-Valve-Controlling Mechanism, of which the following is a specification.

This invention has for its object to provide certain improvements in that type of engines used for autovehicles; and it comprehends a centrifugal governor mechanism coöperatively joined with the throttle-valve for automatically effecting a variable-timed shifting action of the said valve, whereby to govern the engine speed, combined with a manually-operated lever mechanism also connected with the throttle-valve and adapted to control the same independently of the governor-actuating shifting means and in such manner as to cause the said governor-actuating means to cease to act on the valve when that member is controlled by the manually-operated devices.

My invention embodies a peculiar coöperative arrangement of centrifugal governor devices and manually-operatable means both connected with the throttle-valve and each capable of independent movement for controlling the valve, and other details of construction and novel arrangement of parts, all of which will hereinafter be described, and specifically pointed out in the appended claims, reference being had to the accompanying drawings, in which—

Figure 1 is a horizontal section, parts being in plan view, of an engine equipped with my combined governor and throttle-valve-controlling mechanism. Fig. 2 is a detail side view illustrating the connection of the foot-lever and its joint with the throttle-valve-shifting link.

In the drawings, A designates the engine, in which are included a cylinder $a$, the working-agent-valve intake $a'$, the exhaust $a^2$, the piston B, the crank-shaft C, and the exhaust-valve-shifting devices D, connected to the crank-shaft, all of which parts may be of any well-known or preferred construction, as they *per se* form no part of my invention.

On one end of the crank-shaft C is mounted a centrifugal operating governor mechanism comprising a collar 1, fixedly joined with the shaft-section $C^\times$ and provided with diametrical oppositely-disposed bifurcated ears $1^a$, in which the weighted angle-levers 20 are fulcrumed, said levers having their inwardly-extended members $20^a$ provided with ball-heads to engage the annular groove $12^a$ in the shiftable collar 12. The outwardly-extended weighted ends of the said levers oppose each other and are joined by a stout coil-spring 15.

The collar 12, slidably held on the shaft C, is also formed with a groove $12^b$, with which engages a yoke member $14^a$, adjustably mounted upon one end of a rocking lever I, mounted in the sleeve I', fulcrumed upon the bracket $i$, bolted to one side of the engine-frame, as shown.

The feed-intake for the engine joins with the valve-chamber 16, which has a lateral $16^a$ for connecting with the feed-pipe 17, and the said chamber has a valve-seat $16^b$, with which the throttle-valve 18 is adapted to engage. The stem or rod $18^a$ of the said valve 18 extends up through the long bearing $18^b$, and at its projected end it has a pair of fixedly-held collars 19 $19^a$, the purpose of which will presently appear.

To the outer end of the valve-rod $18^a$ is pivotally joined a link 21, which also connects with one end of a bell-crank lever J, suitably fulcrumed, and whose other end is pivotally joined to the short member of another bell-crank lever H, which is disposed in a plane at right angles to the lever 21, and the long member thereof carries a pedal portion H', as clearly shown. So far as described it is manifest that by pressing on the foot-lever H the valve 18 can be shifted at will and held in the positions desired.

The foot-lever devices for actuating the valve are especially intended to provide for a high-speed running of the engine, the same serving to positively lift the valve from its seat and to hold the valve to the adjusted position as long as desired. The outer end of the rocking lever I has an adjustable extension 25 connected therewith, and the end thereof is apertured, as at $25^a$, for the passage therethrough of the valve-stem 18, said aperture $25^a$ having such diameter that the member 25 will move freely on the stem $18^a$ or the stem freely move through the member 25 without binding.

On the valve rod or stem 18ª, between the member 25 and the fixedly-held collar 19, is disposed a stout coil-spring E, which exerts a tension on the lever I against that which the said lever requires from the shiftable governor devices. In the drawings the several parts are positioned to indicate the governor-weights out to their farthest point and the throttle-valve closed, such position of the parts occurring when the engine is running at the highest speed for which it is adapted to operate, it being understood, by reason of the variations in the governor mechanism, and the sliding of the collar 12 will cause the lever I to rock on its bearing and its outer end to lift the valve by engaging the upper collar 19ª on the valve-stem, such operations occurring at frequent intervals to admit enough of the working agent to keep up the speed. Now by reason of the peculiar connection of the foot-lever with the valve and the coöperation of the governor mechanism therewith it will be apparent that pressure on the foot-lever will act on the crank-lever J, and the valve-stem will thereby be pulling out and the valve held open regardless of the action of the governor devices.

The coil-spring E permits the valve-stem to be moved outward by sliding through the aperture in the member 25, and as soon as the foot-pressure is released the said coil-spring E will return the valve to its normal position and to be then controlled by the governor devices, it being clear that when the foot-power is pressed the valve is controlled thereby entirely, as the governor devices during the foot-pressure cease to act on the said valve.

As shown in Fig. 1, the parts are in the position they assume when the engine is running at its predetermined normal speed. By pressing on the foot-lever H' in the manner before described the valve 18 will be held open regardless of the centrifugal governor device, whereby an excess of increased speed is obtained.

Slight changes in the details of construction and modifications thereof may be readily made within my invention as defined by the appended claims.

Having thus described my invention, what I claim, and desire to secure by Letters Patent, is—

1. A mechanism of the character described, comprising in combination with the engine drive-shaft, and the engine throttle-valve, a governor device mounted upon and operated by the crank-shaft, and a manually-operatable lever mechanism separate therefrom, said governor devices and lever mechanism having a common connection with the throttle-valve, and each being arranged to operate independently of the other for opening and closing the said throttle-valve, as set forth.

2. The combination with the crank-shaft and the throttle-valve, the latter having a projecting stem; a centrifugal governor mechanism mounted on and controlled by the crank-shaft, a manually-operatable bell-crank lever separate therefrom, said lever and the governor mechanism being connected with the valve-stem, the former directly and the other indirectly therewith, for the purposes described.

3. In a mechanism as described, the combination with the engine drive-shaft, and the working-agent-feed-controlling valve; of a speed-governor mechanism mounted upon and operated by the drive-shaft, said governor mechanism including a shiftable arm, yieldingly connected with the valve-stem, and adapted under one movement to shift the valve to an open position, automatically-operating means for forcing the valve to its closed position, and an independently mounted and operated manually-operatable lever joined with the said valve-stem adapted to move the valve to an open position independent of the governor-mechanism action thereon whereby the engine may be run at a greater speed than permitted by the governor mechanism, for the purposes stated.

4. In a mechanism as described, the combination with the drive-shaft, and the throttle-valve, the latter including a projecting stem, and a pair of spaced collars fixedly connected to said stem, a rockably-mounted lever having an apertured end, loosely slidable on the valve-stem, between its fixed collars, a coil-spring on the said stem between the said apertured end and the innermost collar on the stem, a governor mechanism controlled by the drive-shaft and connected with the rockable lever, and a manually-operatable pull member connected to the outer end of the throttle-valve stem for holding said valve open while the engine is running at a predetermined maximum speed under the control of the governor device, whereby the speed of the engine can be increased above said predetermined maximum speed, as and for the purposes described.

5. The combination with the throttle-valve, said valve having a pair of separated collars 19 19ª fixedly mounted thereon, a swingable lever having an apertured end freely movable on the valve-stem between its collars, a coil-spring engaging one of the said collars and the apertured end of the rockable lever, a governor mechanism controlled by the drive-shaft for shifting the said rockable lever, the bell-crank lever J, a link connection joining the said lever with the outer end of the valve-stem, and a bell-crank foot-lever, joined with the lever J, said foot-lever and its valve connections being independently arranged and operated from the governor device whereby the normal or predetermined governor-controlled speed can be exceeded, all being arranged substantially as shown and for the purposes described.

RALPH BENTON HAIN.

Witnesses:
CARROLL S. HARTMAN,
GRACE NICHOLSON.